E. HARTMAN.
VEHICLE WHEEL.
APPLICATION FILED OCT. 31, 1908.
937,798.
Patented Oct. 26, 1909.
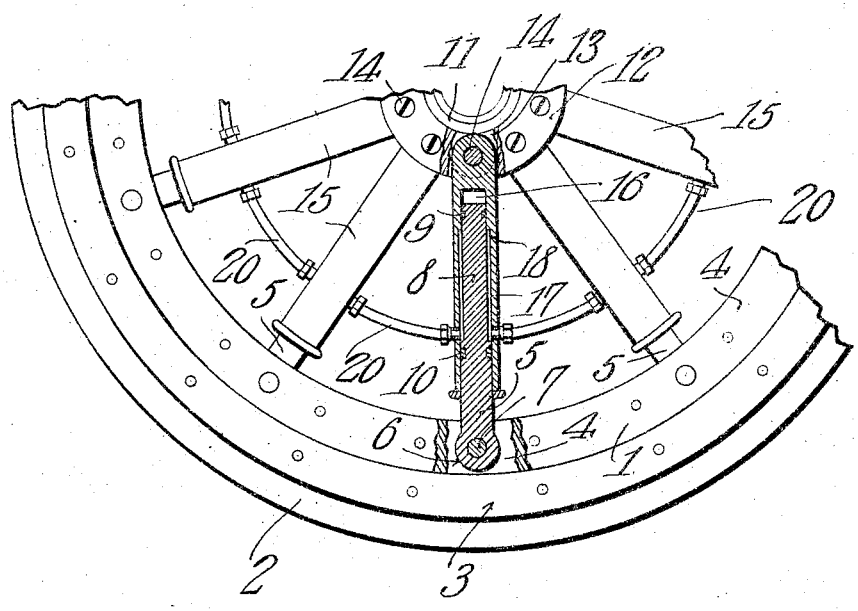

UNITED STATES PATENT OFFICE.

EMIL HARTMAN, OF BROWNSVILLE, TEXAS.

VEHICLE-WHEEL.

937,798. Specification of Letters Patent. Patented Oct. 26, 1909.

Application filed October 31, 1908. Serial No. 460,473.

*To all whom it may concern:*

Be it known that I, EMIL HARTMAN, a citizen of the United States, residing at Brownsville, in the county of Cameron and State of Texas, have invented a new and useful Vehicle-Wheel, of which the following is a specification.

This invention relates to vehicle wheels of that type utilizing yieldable connections between the rim and hub, so that pneumatic tires and the like may be dispensed with.

The object of the invention is to provide spokes of novel form for use in taking up or absorbing vibration, said spokes being neat and durable, and being so constructed as to permit all necessary movement of the rim relative to the hub.

With these and other objects in view the invention consists in certain novel details of construction and combinations of parts hereinafter more fully described and pointed out in the claims.

In the accompanying drawing which is a view partly in elevation and partly in section of a portion of a wheel embodying the present improvement, the preferred form of the invention has been shown.

Referring to the figures by characters of reference, 1 designates the rim of the wheel, the same being provided with a tire 2 of rubber or other suitable material, said tire being retained in position in any preferred manner as by means of annular flanges 3. Parallel flanges 4 extend inwardly from the rim and mounted between the flanges at regular intervals are the outer spoke members 5, each of said members being provided, at its outer end, with an eye 6, located between flanges 4 and mounted on a pivot pin 7 insertible transversely through the flanges. Each section 5 is reduced annularly for a portion of its length so as to form a stem 8, the inner or free end of the stem being provided with an annular packing ring 9 of any suitable construction, while another similar packing ring 10 is preferably formed on the section 5 close to the other end of the stem 8. This construction has been clearly shown in the drawings.

The hub 11 has spaced annular flanges 12 and 13 thereon, through which extend pivot pins 14 which may, if desired, be in the form of screws. Each of these pivot pins extends through one end of an inner spoke section 15 having an elongated bore 16 therein the diameter of which is equal to the diameter of the stem 8. This bore is counterbored for the greater portion of its length as indicated at 17 so as to receive the section 5 and the packing ring 10 thereon. An interior shoulder 18 is formed at the inner end of the counter-bore. Flexible tubular connections 20 are provided between the spoke sections 15, said connections opening into the counter-bores 17, so that when the wheel is at rest and relieved of pressure, all of the counter-bores will communicate through these tubular connections. The sections 15 are designed to contain a compressible gaseous fluid and when the sections 5 are forced longitudinally into the sections 15 the fluid contained within the sections 15 cushions the sections 5. It will be noted that when the parts are in their normal positions the tubes 20 open directly into the counter-bores 17. It is thus possible for any fluid contained in the upper spokes to flow downward into the lower spokes so as to keep said lower spokes filled. As soon as the wheel is subjected to pressure the sections 5 of the lower spokes are forced longitudinally within their sections 15 and communication with the adjoining tubes is thus cut off and the fluid confined within the spokes is prevented from escaping. As the spokes move upwardly however the confined fluid returns the sections 5 to their initial positions and communication with the tubes 20 is reëstablished. It will be seen therefore that any loss of fluid due to leakage will not affect the operation of the wheel as a cushioning medium.

By pivotally mounting the sections 5 and 15 within the rim and the hub respectively, all necessary oscillating movement of the spokes is permitted and it will be seen therefore that the wheel will operate efficiently to reduce jarring, so as to render the use of a pneumatic tire unnecessary. By providing the packing rings 9, the fluid confined within the inner ends of the bores 16 is compressed during the inward movement of each section 5, this compressed fluid thus serving to assist in cushioning the sections 5 and yieldingly retarding their movement.

What is claimed is:—

1. A wheel comprising a hub, tubular spoke sections extending therefrom, tubes connecting said sections, the sections constantly communicating through the tubes, a rim, and spoke sections extending from the rim and slidably mounted within the tubular sections, said slidable sections constituting means for closing communication between the tubular sections and the tubular connections during the movement of said slidable sections in the direction of the hub.

2. A vehicle wheel comprising a hub, tubular spoke sections pivotally connected thereto, flexible tubular connections between said sections, a rim, and spoke sections pivotally connected to the rim and slidably mounted within the tubular sections, said slidable sections constituting fluid-compressing means and also constituting means for cutting off communication between the tubular spoke sections and the tubular connections during the movement of the slidable spoke sections in the direction of the hub.

In testimony that I claim the foregoing as my own, I have hereto affixed my signature in the presence of two witnesses.

EMIL HARTMAN.

Witnesses:
 José Celaya,
 E. A. McGary.